United States Patent [19]
Parkinson et al.

[11] Patent Number: 5,472,575
[45] Date of Patent: Dec. 5, 1995

[54] VACUUM AND INFRA-RED RADIATION SOLVENT EVAPORATION

[75] Inventors: Martin Parkinson, Nyack, N.Y.; Francis Gomer, Jersey City, N.J.

[73] Assignee: Maustat Corporation, New York, N.Y.

[21] Appl. No.: 195,218

[22] Filed: Feb. 14, 1994

[51] Int. Cl.[6] ............................ B01D 1/22; B01D 3/10; B01D 3/08
[52] U.S. Cl. ............ 202/205; 202/206; 202/236; 202/238; 202/267.1; 203/2; 203/86; 203/89; 203/100; 203/DIG. 22; 159/7; 159/11.1; 159/11.2; 159/12; 159/49; 159/DIG. 1; 159/DIG. 7; 159/DIG. 15; 159/DIG. 26
[58] Field of Search ........................ 203/100, 86, 89, 203/72, 91, DIG. 2, 2, 99; 202/238, 206, 236, 234, 205, 160, 267.1; 159/11.2, 11.1, 9.1, 9.2, 7, 6.1, 12, 23, 49, DIG. 6, DIG. 26, DIG. 7, DIG. 15

[56] References Cited

U.S. PATENT DOCUMENTS

| | | | |
|---|---|---|---|
| 2,527,349 | 10/1950 | Black | 202/206 |
| 2,843,535 | 7/1958 | Zaugg | 202/238 |
| 3,091,577 | 5/1963 | Pequignot | 159/DIG. 6 |
| 3,250,687 | 5/1966 | Frank | 202/238 |
| 3,505,172 | 4/1970 | Achener | 159/DIG. 6 |
| 3,830,698 | 8/1974 | Kleiss | 202/206 |
| 4,790,911 | 12/1988 | Parkinson | 202/205 |
| 4,913,777 | 4/1990 | Parkinson | 202/238 |
| 5,174,864 | 12/1992 | Arbizzani et al. | 202/206 |

*Primary Examiner*—Wilbur Bascomb, Jr.
*Attorney, Agent, or Firm*—Martin Parkinson

[57] ABSTRACT

A rotary evaporator is described utilizing a magnetically driven fluorocarbon cylinder, operating within a solvent container, to create a thin solvent film for rapid evaporation without the usual requirement for rotating the entire solvent container assembly. Infra-red heating is employed for efficient evaporation rates. Solvent heating is controlled during evaporation by a single temperature probe, turning the infra-red heater on and off on demand of the probe. Over heating of the product is prevented by maintaining a solvent residue at or near the conclusion of an evaporation.

12 Claims, 6 Drawing Sheets

VACUUM AND INFRA-RED RADIATION SOLVENT EVAPORATION

BACKGROUND

This invention relates to solvent evaporators, and in particular to laboratory scale rotary evaporators.

Current laboratory practice makes use of the popularly named "rotary evaporator" to either concentrate or remove solvents such as alcohol, acetone, water, and so on, from various samples. The solvents to be concentrated or removed are typically placed in a pear shaped PYREX (a registered trademark of Corning Glass Works) flask which is then connected to a motor which will cause the flask to be rotated. Means are provided for connecting the flask to a source of vacuum which usually includes a means for condensing the evaporating solvents as well as a vacuum pump, and the flask is usually placed in a water bath which can be temperature controlled with thermostatically controlled heating. Under these conditions of flask rotation and vacuum the solvents are evaporated efficiently while frothing and bumping that often accompanies a vacuum distillation is suppressed to various degrees. Both batch and continuous process rotary evaporations of this type are described in U.S. Pat. No. 2,797,747 and U.S. Pat. No. 2,865,445.

While the above mentioned devices have proven to be generally satisfactory, there are problems inherent to their design which has been addressed by U.S. Pat. Nos. 4,790,911 and 4,913,777. In these two patents a solvent evaporator is disclosed which does away with the necessity for rotating the solvent flask by placing a magnetically driven cylinder within the flask. A rotatable magnet exterior to the flask causes the cylinder within the flask to rotate in synchrony, thereby developing a thin solvent film on both the exterior and interior of the cylinder, providing for efficient solvent evaporation, and frothing and bumping control, when a vacuum and thermostatically controlled heating is applied to the solvent container. A conventional heated water bath can be used to expedite solvent evaporation, or, since the solvent container is stationary, hot plates or heating mantles can be used as a source of thermostatically controlled heating. While the above described stationary evaporator can eliminate the cumbersome and expensive water bath heating methods usually employed, ordinary conductive heaters provide slower evaporation rates in comparison to the standard water bath. To overcome this, the instant invention makes use of infra-red heating to provide comparable solvent removal efficiencies to water bath procedures without the use of a water bath, while at the same time maintaining the simplicity of operation of the stationary solvent evaporator.

Accordingly it is a primary object of the invention to provide an efficient rotary evaporator without the necessity for utilizing a water bath.

Another object of the invention is to provide a rotary evaporator in which solvent evaporation is expedited by means of infra-red radiation.

Still another object of the invention is to provide a stationary solvent container for rotary evaporation procedures expedited by means of infra-red radiation.

An additional object of the invention is to provide an infra-red heated solvent evaporation in which the entire contents of the container are simultaneously heated by means of infra-red radiation.

A further object of the invention is to provide simple and economical temperature control within a solvent container being heated by means of infra-red radiation.

Additionally an object of the invention is to provide for automatic monitoring of the temperature within a solvent container in a simple and economical manner.

SUMMARY

These and other objects are obtained in the instant invention of an infra-red heated rotary evaporator of the type in which the solvent container remains stationary while a thin solvent film is developed on both the interior and exterior surfaces of a magnetically rotated cylinder within the solvent container.

In one version of the invention a clear PYREX container is heated with an infra-red radiation generating hot plate type of heater. Infra-red radiation is substantially in the electromagnetic spectrum between 1 to 20 microns. Most organic materials absorb infra-red radiation in the range of 2.6 to 6 microns. The heater employed in this version of the invention is a 600 watt heater having metal resistors inset in a ceramic blanket. The heater produces micron wavelengths between 2.6 microns to 6 microns with a maximum of 40 watts per square inch. Infra-red radiation is efficiently generated through a square plate of VYCOR (a registered trademark of Corning Glass Works) glass. Infra-red heaters of this type are available from Manostat Corporation, 518 Eighth Ave., N.Y., N.Y. 10018.

A clear TEFLON (a registered trademark of E.I. du Pont de Nemours) cylinder containing a circular 8 pole ceramic magnet is placed within the cylindrical PYREX glass container, the container having a substantially flat base and an open top. Solvent to be processed is placed within the container, and the top of the container is closed with a suitable closure such as a TEFLON cap with a VITON (a registered trademark of E.I.du Pont de Nemours) O ring to provide both a liquid and gas tight seal for the container. The container is then placed in a substantially horizontal manner on a stand, the stand being on the surface of the flat plate infra-red heater. Immediately adjacent to and projecting upward from the heater is a control box portion of the solvent evaporator assembly which contains a motor and a similar 8 pole ceramic magnet to the magnet within the cyliner within the container. The flat base of the container is positioned close to this external magnet so that both the internal and external magnets securely magnetically engage one another. An opening within the TEFLON closure for the container provides for the vacuum tight connection of a vapor transport tube to permit the escape of evaporating solvent vapors from the container, the vapors then to be directly pumped out of the system by a source of vacuum, or the vapors to be condensed by a cooled condenser connected between the vapor transport tube and the source of vacuum. A second opening within the TEFLON closure provides for the connection of a temperature probe, such as a thermocouple, thermistor, or RTD probe within the container. This probe is electrically connected to the infra-red heater and a temperature display/set point panel so that the infra-red heater is turned on and off on demand of the temperature probe. A third opening, capped with a TEFLON plug, is provided in the TEFLON closure so that additional solvent can be added to the container if a continuous solvent evaporative procedure is to be undertaken.

The stand for the solvent container is arranged so that the front of the solvent container, i.e. that portion of the container having the TEFLON closure, is approximately 15 degrees higher than the base portion of the container relative to the flat VYCOR plate of the heater. The temperature probe is arranged so that the tip of the probe which contains the heat sensing element is against the internal surface of the container at a point designated the heat detecting area. This heat detecting area is near the front end of the container and is offset latitudinally approximately 30 degrees (assuming the closest point of the container at this latitude to the VYCOR heater surface is at 0 degrees) from the point in this area of the container that would become warmest during heating relative to the remaining internal surface area of the container.

To operate the solvent evaporator of the instant invention the temperature display/set point panel is set to a predetermined safe solvent evaporation temperature, the motor for rotating the external magnet is activated, the source of vacuum is activated, and the infra-red heater is turned on. Under the influence of the vacuum, infra-red radiation and cylinder rotation solvent evaporation proceeds efficiently. Overheating of the solvent is prevented since the heat detecting area within the container will become free of solvent due to the tilt of the container and the latitudinal placement of the tip of the temperature probe while there is still a small residual quantity of solvent in the base portion of the container remaining to provide evaporative cooling to the remainder of the container. Infra-red radiation is therefore turned off on demand of the temperature probe before any major portion of the internal area of the container is subjected to excess heat.

In a second version of the invention, instead of the solvent container being tilted, a well area within the container permits placing the container generally parallel to the flat VYCOR heating surface while at the same time allowing a residual quantity of solvent to remain at or near the conclusion of an evaporative procedure. In this manner the same protection against overheating the sample being processed is provided as is the case when the solvent container is tilted. To create this well area within the solvent container a similar cylindrical solvent container is employed as was the case in the first version described above. In this second version of the invention a circular bulge is fabricated into the container immediately adjacent the flat base of the container. During an evaporative procedure a small excess of solvent will remain in this base area of the container relative to the remainder of the container. Once again, at or near the conclusion of an evaporation the temperature probe in contact with the same heat detecting area previously described in the first version of the invention will become free of solvent and turn the infra-red heater off before any major portion of the internal area of the solvent container is subjected to excess heat.

In this manner solvents are concentrated or removed from samples with unusual efficiency, and without danger of product overheating even without constant operator supervision. At the same time product removal is facilitated by the wide mouth construction of the solvent container, and, of course, since the container is stationary throughout any evaporative procedure troublesome rotary seals are eliminated and continuous solvent addition is greatly simplified.

The invention has been described above as utilizing a cylindrical PYREX glass solvent container. PYREX is at least partially transparent to selected wavelengths of infrared radiation making it particularly useful for this application. Obviously a variety of other materials, including certain plastics, will also permit efficient transmission of infrared radiation, and a variety of other shapes for the solvent container may be employed. Similarly the clear TEFLON cylinder described permits efficient transmission of infra-red radiation, as will a variety of other plastics, and, of course, glass that can be used in place of TEFLON. The circular 8 pole ceramic magnets described have proved economical and efficient for this application, but obviously a variety of conventional and rare earth magnets could be similarly employed, including an electromagnetic drive external to the solvent container. The flat, hot plate type infra-red heater described is considered particularly useful for this application. Other infra-red devices, including heat lamps, emitting infra-red radiation at other wavelengths, can similarly be employed placed either below or above or surrounding the solvent container.

DETAILED DESCRIPTION

Figure 1:
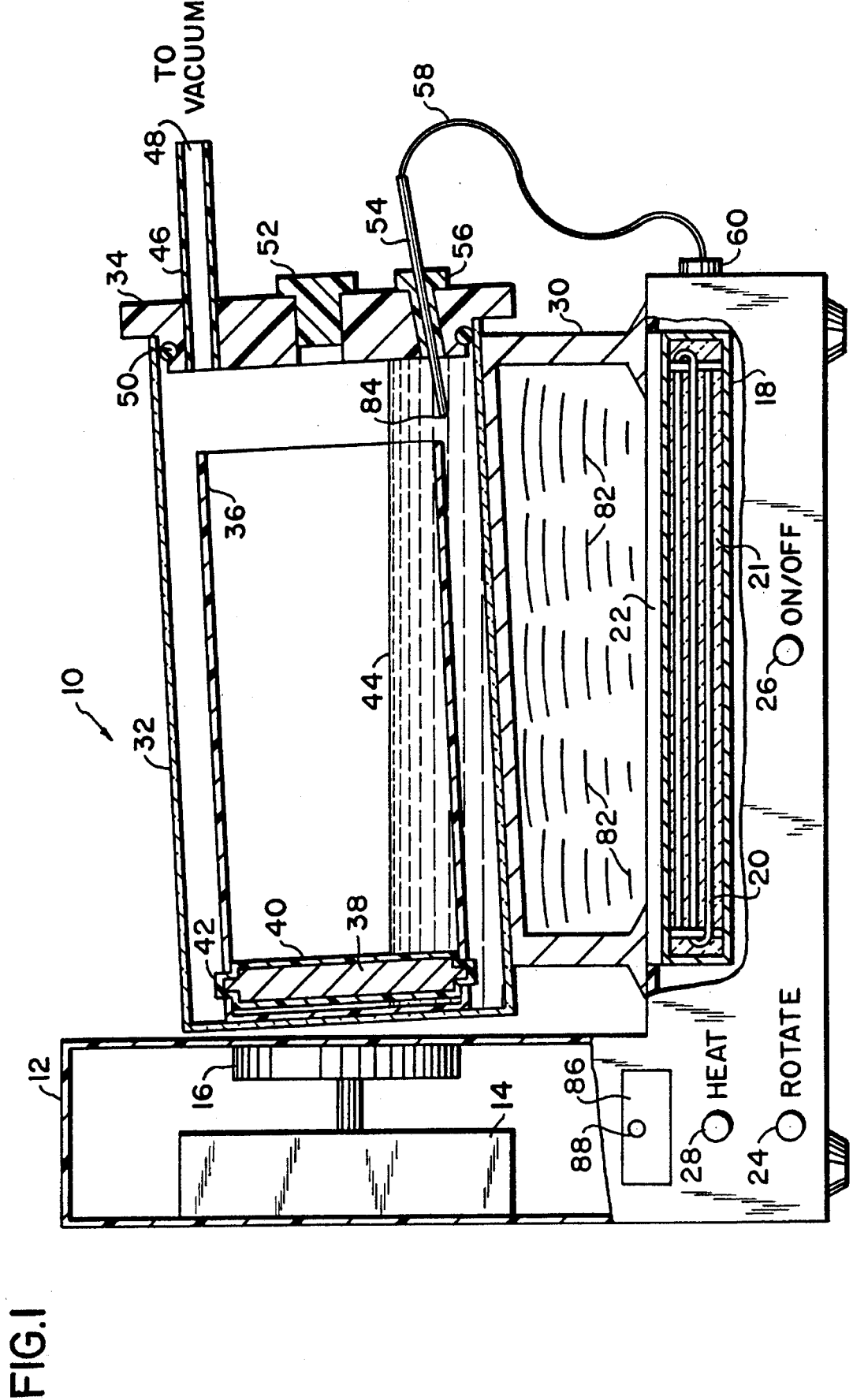
FIG. 1 is a partially sectional view of a first version of the solvent evaporator, showing the solvent container in tilted position.
Figure 1A:
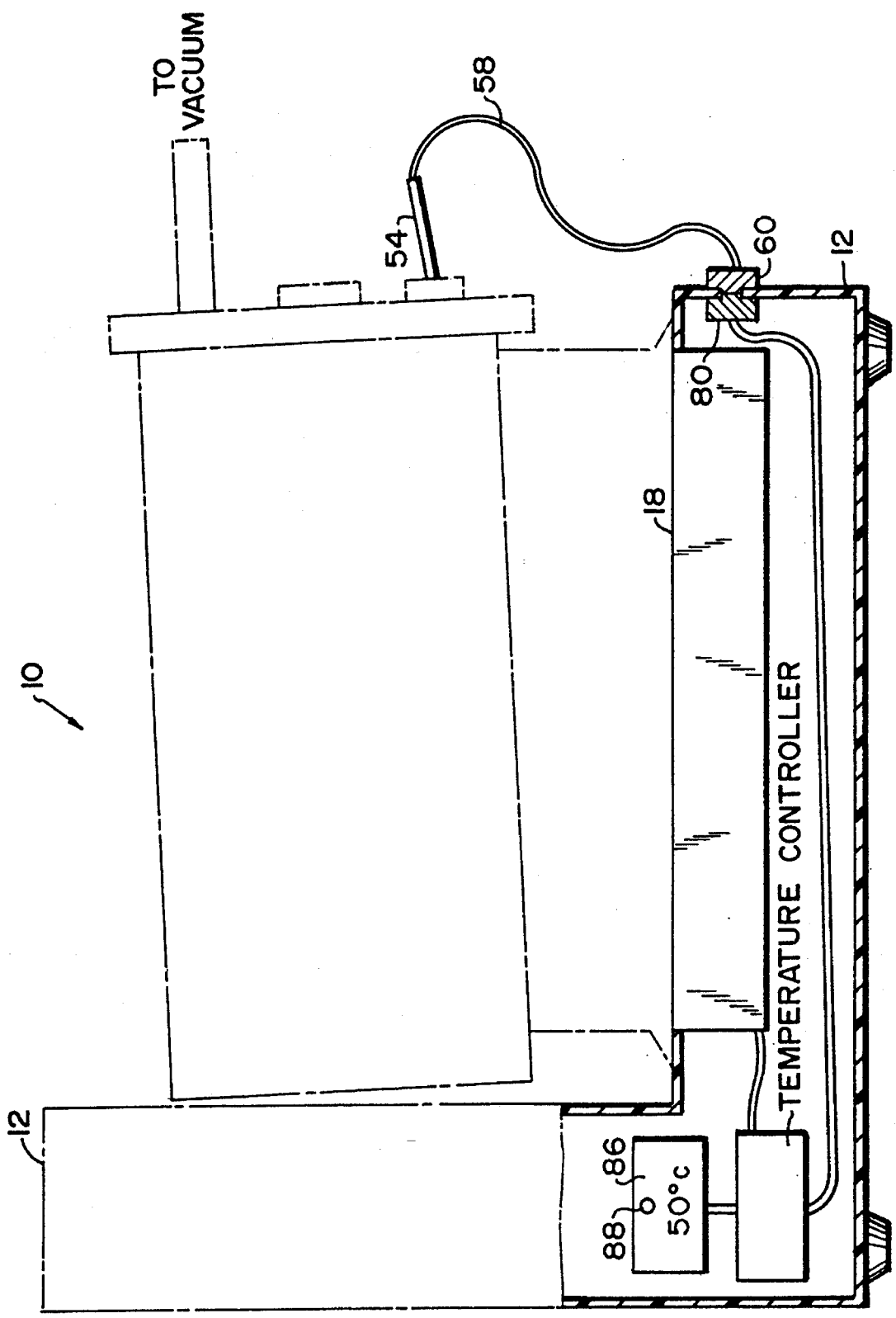
FIG. 1A is a perspective view of the solvent evaporator of FIG. 1, with the solvent container shown in phantom and the control box shown partially broken away to show one version of the product temperature display and control.

Referring now to the drawings wherein like structures having the same function are referred to with like numerals, in FIG. 1 a version of the solvent evaporator 10 in accordance with the present invention is shown. A control box 12, which can be made out of a variety of materials and in this example steel being the preferred material, houses a motor 14, the motor having a circular shaped 8 pole ceramic magnet 16 attached to it. A laterally extending portion of the control box contains an infra-red radiation emitting heater 18. The heater 18 contains metal resistance elements 20 encased in a ceramic blanket 21. During operation infra-red radiation 82 is efficiently transmitted through a flat VYCOR (a registered trademark of Corning Glass Works) plate 22. The infra-red heater is conventional, and well known to the art. For the purpose of laboratory scale evaporations, e.g. 50 ml. to 1 liter, maximum power is 600 watts at 110 volts, A.C. Maximum watts/square inch is 40, and the infra-red wavelength range in microns is 2.6 to 6.0. Infra-red heaters of this type are available from Manostat Corporation, 518 Eighth Ave., N.Y., N.Y. 10018. Controls within the control box include an on/off switch 26 for the entire apparatus, an analog indicator knob 24 to activate the motor 14 and regulate the rotation of the first magnet 16, and a heat knob 28 to turn on the infra-red heater 18 and to set a high limit temperature on the LED temperature diplay/set point panel 86. These electrical and electronic switches and controls are all interconnected electrically in a conventional manner as shown in the drawings, and all are conventional and well known to the art.

The flat upper surface of the laterally extending portion of the control box has a stand 30 for supporting a solvent container. The stand provides a slope of approximately 15 degrees from the horizontal surface of the VYCOR top plate 22 on the infra-red heater, from that portion of the stand which is nearest to the first magnet 16, to the end of the stand 30 which is farthest away from this magnet, the full length of the stand being directly over the VYCOR top plate.

Figure 4:
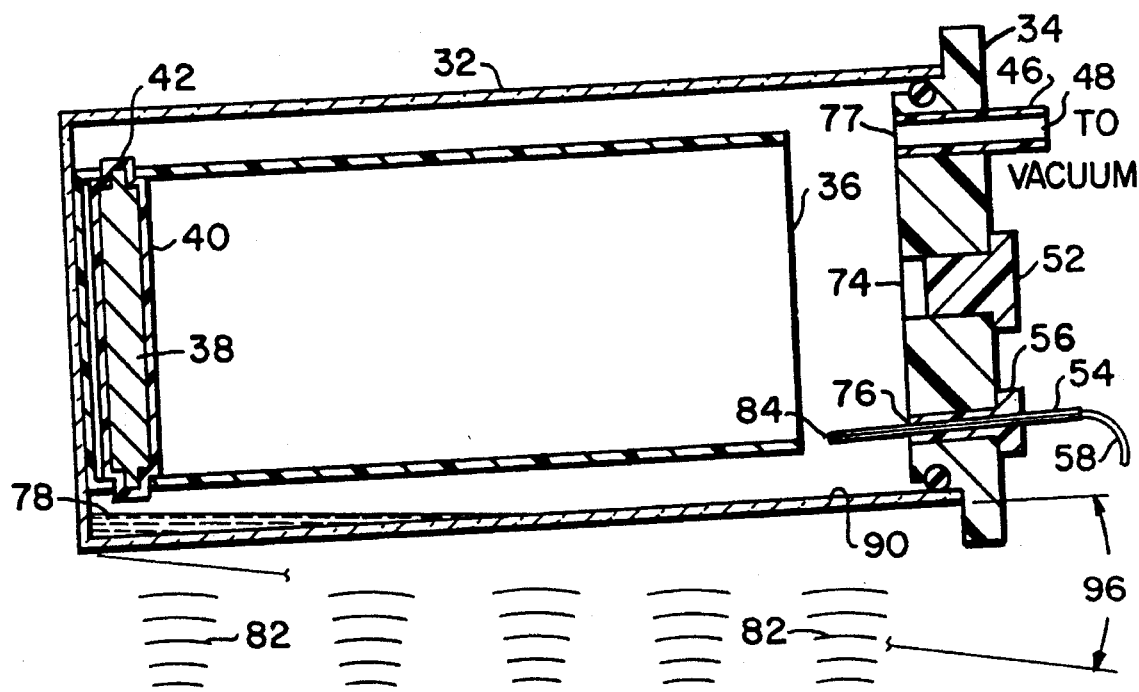
FIG. 4 is a sectional view of the container and container closure portion of the solvent evaporator, illustrating a first container in a tilted position.

Solvent container 32 is placed directly on the stand 30. The embodiment of the solvent container 32 shown in FIGS. 1 and 4 is a cylindrical PYREX container having a substantially flat, fully closed base portion and an open top. Prior to being placed on the stand 30, the container 32 has the cylinder 36 together with second magnet 38 placed within it, and then the solvent 44 to be evaporated is placed within the container 32. The open top of the container is then sealed with a vacuum tight closure such as the closure 34 illustrated in FIG. 1. This closure is fabricated in TEFLON, having a VITON (a registered trademark of E.I. du Pont de Nemours) O ring around its circumference in order to provide the vacuum tight seal. Openings within this closure (74, 76, and 77—FIG. 4) are for the connection of a PYREX vapor transport tube 46, containing vapor conduit 48, a TEFLON plug 52 to seal the opening 74 for additional solvent entry into the container, and for the insertion of a stainless steel (or TEFLON coated) temperature probe 54 within the container.

With the closure 34 in place sealing the open top of the container 32, and with the vapor transport tube 46 secured to the closure, the solvent addition opening 74 sealed shut with the plug 52, and the probe 54 vacuum tight secured within the closure 34 by means of TEFLON knurled vacuum securing knob 56 with the tip of the probe in contact with the inner surface of the container 32 at heat detection area 84 (FIG. 4), the container is placed on the stand 30 so that the flat base surface of the container is immediately adjacent the first magnet 16. Under these conditions the first magnet 16 and the second magnet 38 will securely magnetically engage one another in their respective magnetic fields of attraction.

To operate this version of the invention depicted in FIG. 1 the on/off switch 26, which is connected to a conventional source of electricity (not shown) is turned on to provide power for all of the equipment, and the analog indicator knob 24 is turned on and set at a cylinder rotation, such as, for example, 200 r.p.m.'s, considered suitable for the evaporation. This action causes the first magnet 16 to rotate and in turn the second magnet 38 rotates in synchrony with it. The second magnet 38 operates within the cylinder 36, and is encased in a clear TEFLON envelope 40 to assist in providing an inert environment in which the solvent 44 is to be processed. The second magnet envelope 40 has four projections 42 spaced equidistantly about its periphery for engaging matching slots 72 within the cylinder 36, so that as the two magnets rotate in synchrony the cylinder 36 is also caused to rotate within the container 32, thereby developing a thin solvent film on both the external and internal surfaces of the cylinder. The cylinder is similarly fabricated in clear TEFLON, of approximately 10 mils thickness in order to maintain an inert environment for the evaporating solvent. The vapor transport tube 46 is then connected at its end external to the container 32 to a source of vacuum, such as a water aspirator (not shown), or to a cooled condenser (not shown), such as a water cooled or dry ice cooled condenser which in turn is connected to a source of vacuum. The electric plug 60 which connects the probe by means of wire 58 is connected to an electrical outlet 80 within the control box, which in turn is connected in series (not shown) with the LED temperature display/set point panel 86 and the heat knob 28. To activate the infra-red heater 18 on demand of the temperature probe, the heat knob 28 is turned on and the temperature display/set point is set to an arbitrarily selected high temperature, such as, for example, +50 degrees C. (as shown in the drawings) if it is expected that the actual boiling point of the solvent under the obtained vacuum would be, for example, 30 degrees C. After a few minutes the solvent will be seen to be boiling. The temperature setting on the temperature display/set point panel is then reset at the actual boiling temperature of the solvent 44. The boiling point of the solvent is determined by turning the heat knob 28 to progressively cooler temperatures than the original heat setting, and at some temperature below the original heat setting it will be observed that an on/off infra-red heater indicator light 88 within the temperature display/set point panel 86 "flickers" on and off. This is the actual boiling point of the solvent under the prevailing vacuum, and the infra-red heater will now go on and off on demand of the temperature probe, which at least initially is in contact with the solvent. Under these conditions the evaporation will now proceed efficiently, without the necessity for continuous operator monitoring of the temperature of the evaporation in order to prevent excessive heating of a dried product at the conclusion of an evaporation. The above outlined procedure insures that a small solvent residue will remain in the container after an efficient period of evaporation has occurred for the major portion of the solvent 44. The residual solvent 78 can then be left to evaporate to dryness over a period of time if desired. Or to rapidly bring this residual solvent 78 to dryness the heat setting on the temperature display/set point panel is re-set a few degrees warmer than the "flicker" or boiling point temperature setting in order to remove this residual solvent quickly.

The necessity for the above described method for sample temperature control derives from the nature of infra-red heating itself. Infra-red heat is traveling at the speed of light whereas conducted heat in materials such as glass is traveling much more slowly. If in the above described example the sample container were in a perfectly horizontal plane with the flat, horizontal infra-red heater, and the temperature probe was placed so as to be immersed in the last remaining solvent residue near the conclusion of an evaporation, overheating of any dried residue would result. The reason for this is that a single temperature probe would keep demanding heat until virtually the last drop of solvent were to be vaporized. Shutting the infra-red heater off at this point still permits the remainder of the container to act as a heat sink, causing over heating of any dried residue. This, of course, can be prevented by using a sophisticated, multi-point detection temperature control system. In the instant invention, however, a simple, inexpensive single point temperature probe 54 is employed while still providing operator unassisted product over temperature protection. This is accomplished by first creating the conditions for the existence of a residue of solvent a spaced distance from the temperature probe near the conclusion of an evaporative procedure. One method for creating this condition is illustrated in FIGS. 1 and 4 by having the solvent container tilted from front to back relative to its position to the infra-red heater. To further insure optimum over temperature protection for the solvent 78 at this point the temperature probe is laterally offset from the deepest level of the solvent so that it is in contact with a second heat detecting area 84 within the container, with the tip of the temperature probe 54 in contact with the inner surface of the solvent container 32. Under these conditions the temperature probe becomes free of solvent and shuts off the infra-red heater before over heating of the residual solvent 78 and any dried residue can occur. Obviously this same method of heat control can be employed for solvent evaporations that do not make use of the thin film developing cylinder 36 and second magnet 38 assembly.

Figure 2:
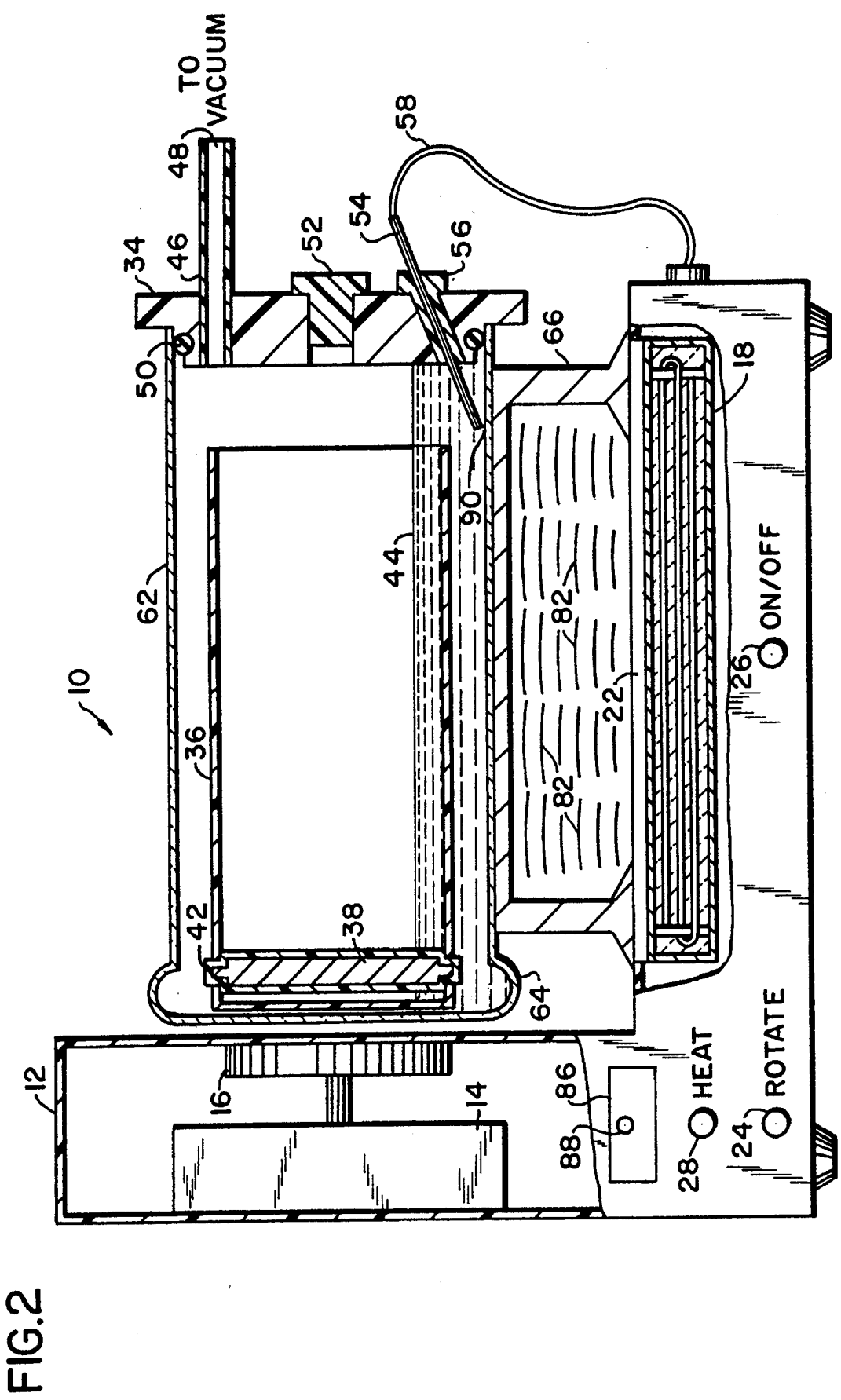
FIG. 2 is a partially sectional view of a second version of the solvent evaporator, showing a solvent container having a well area in place adjacent the base of the container.
Figure 5:
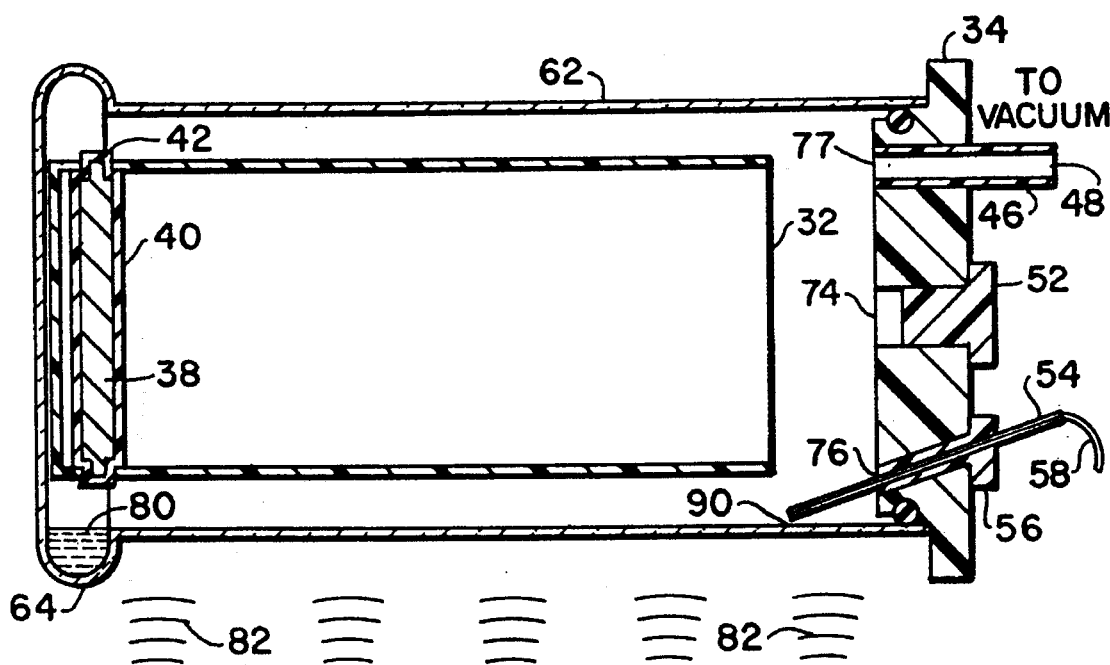
FIG. 5 is a sectional view of the container and container closure, illustrating a second container having a well area.
Figure 6:
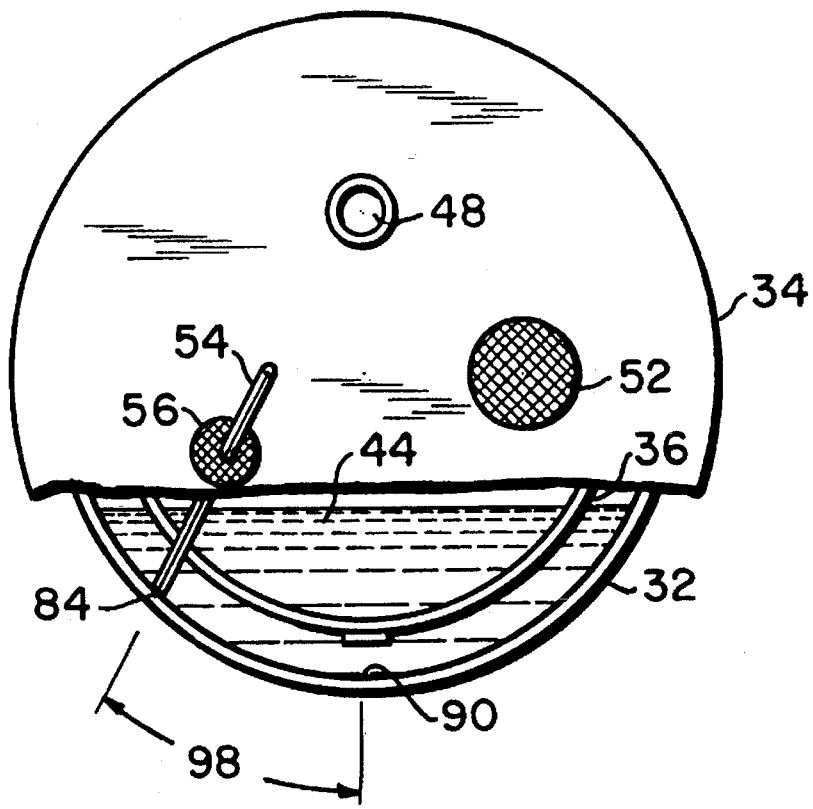
FIG. 6 is a partially sectional end view of the container closure and first container, with the temperature probe at a second heat detecting area.
Figure 7:
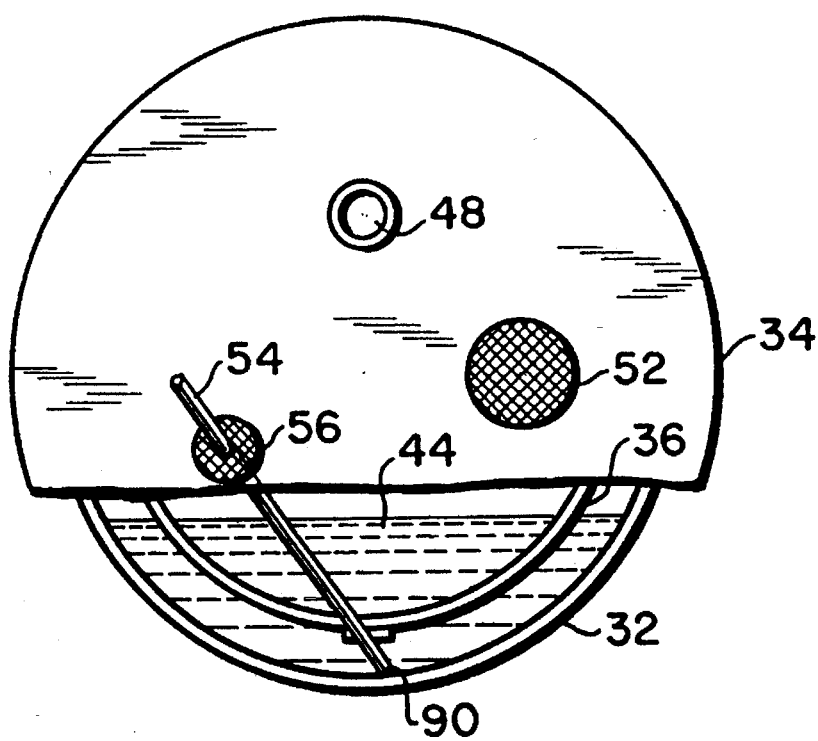
FIG. 7 is a partially sectional end view of the container closure, with the temperature probe at a first heat detecting area.

A second version of the invention is depicted in FIG. 2. The control box 12, motor 14, first magnet 16, infra-red heater 18 and temperature display/set point panel 86 are identical to that described for FIG. 1. The difference lies in the solvent container 62. This container has a circumferential bulge area 64 immediately adjacent the flat base portion of the container. The purpose of this bulge area 64 is to provide a well in order to create the conditions for a solvent residue to exist at or near the conclusion of an evaporation. The same TEFLON closure 34, together with its VITON O ring 50 seal is employed as the closure for the top, open end of the container 62. The same cylinder 36 and second magnet 38 assembly described for the container of FIG. 1 is similarly employed in this case. Since the solvent container 62 is equipped with a well area 64 it is unnecessary to tilt the container as previously described. Once the cylinder 36 and second magnet 38 assembly are placed within the container, solvent 44 added to the container, and the container opening secured with the closure 34 as previously described, the container is simply placed on stand 16 in a horizontal position relative to the flat VYCOR plate 22 of the infra-red heater 18. The flat base portion of the container 62 is placed immediately adjacent the first magnet 16 within the control box 12 so that the first magnet 16 and the second magnet 38 securely engage each other in their respective magnetic fields. FIGS. 2, 5, and 7 illustrate the placement of the temperature probe 54 at a first heat detecting area 90 within the container that is closest to the VYCOR top plate 22 of the infra-red heater at this particular latitudinal plane of the container. This is a permissible placement of the temperature probe, which results in a faster distillation, but usually with some sample heating in excess of the original temperature set point, which may be undesirable for certain heat sensitive materials. For these heat sensitive materials the placement of the temperature probe as shown in FIGS. 1, 4, and 6 is recommended due to superior temperature control at the conclusion of an evaporation.

Figure 3:
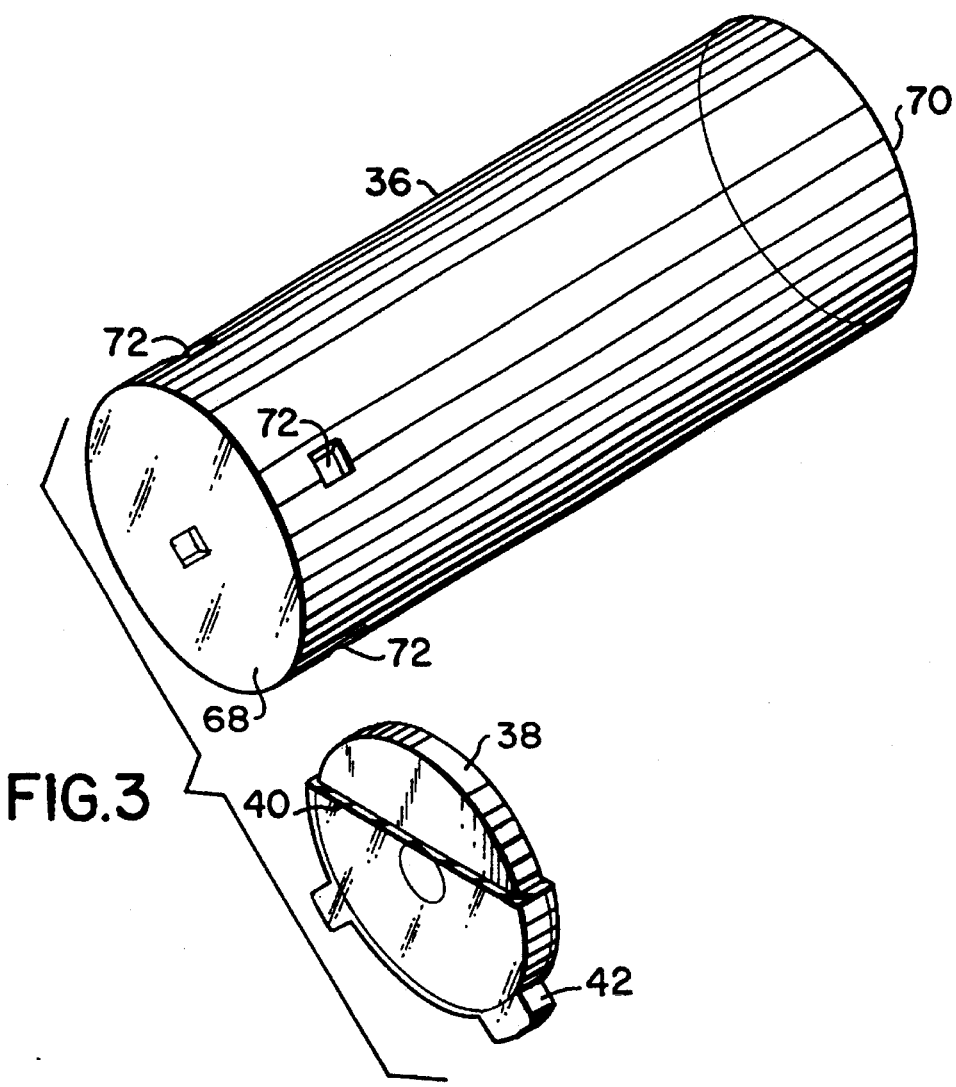
FIG. 3 is an exploded view of the cylinder for solvent film deposition, and magnetic means for rotating the cylinder.
Figure 3A:
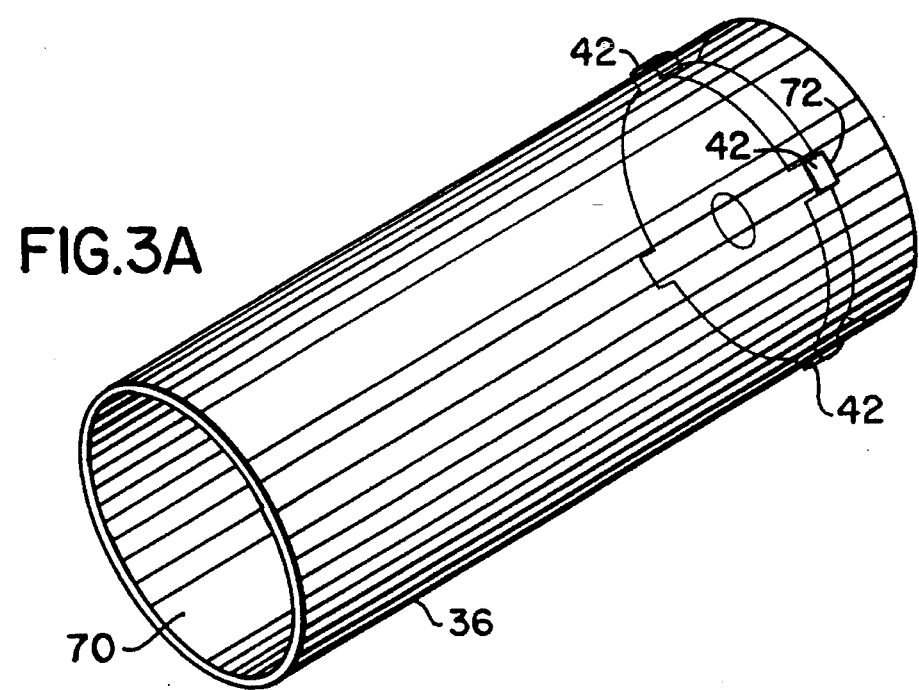
FIG. 3A illustrates the magnetic means for rotating the cylinder in place attached to the cylinder.

FIG. 3 shows an exploded view of the cylinder 36 and second magnet 38 which operate within the solvent containers 32 and 62 to form a thin solvent film on both the internal and external surfaces of the cylinder in order to expedite solvent evaporation. The cylinder 36 also serves the purpose of controlling bumping and foaming which may occur during a vacuum evaporation. The cylinder can be fabricated in glass or a variety of plastics capable of efficient transmission of infra-red radiation. In this preferred embodiment the cylinder is vacuum formed from a clear TEFLON film. This provides solid base portion 68 to the cylinder with the other end 70 of the cylinder being open for efficient vapor escape from the internal portion of the cylinder, and to permit the convenient placement and removal of the second magnet 38. The second magnet is preferably encased in a similar clear TEFLON film 40 to that which forms the cylinder so that a completely inert environment is provided for the solvents to be evaporated. The magnet encapsulating film 40 has four projections 42 on its periphery which slot into matching openings 72 within the cylinder (FIG. 1). In this manner when the second magnet 38 is in place within the cylinder (FIG. 3A) and rotates in synchrony with the first magnet 16, the cylinder is caused to rotate within the solvent container. For purposes of cleaning the magnet and its encapsulating film are simply removed from the cylinder. Obviously, a variety of other methods can be employed for the magnet/cylinder combination, including making the magnet a permanent part of the cylinder, etc.

FIG. 4 illustrates the near conclusion of an evaporative procedure in which the solvent container is tilted so as to provide a solvent residue 78 for the purpose of preventing overheating the solvent sample. The angle 96 illustrated in FIG. 4 is defined by the height of the top portion of the container 32 having the TEFLON closure relative to the base portion of the container having the second magnet 38, as the container 32 is located on the stand 30 (FIG. 1). This angle insures that a solvent residue 78 remains in the solvent container when the temperature probe 54 is placed in contact with heat detecting area 84 (FIGS. 4 and 6). It has been found that an angle 96 of approximately 15 degrees permits efficient infra-red heating of the solvent, and adequate thin film development of all surfaces of the cylinder 36, while insuring a solvent residue at or near the conclusion of an evaporation.

A second version of the solvent container 62 of the invention is shown in FIG. 5. A circumferential well area 64 is built into the base portion of the container. This makes possible the creation of a solvent residue 81 at or near the conclusion of an evaporation even though the solvent container 62 is placed in a horizontal position over the infra-red heater 18 (FIG. 2) without any tilting of the container from front to back. The temperature probe 54 is shown in contact with a first heat detecting area 90 within the container which provides for faster evaporation rates with less control over sample over heating than is provided with the second heat detecting area 84.

In the partially sectional end views (FIGS. 6 and 7) of solvent containers 32 and 62 the optimum placements for the temperature probe is shown. In FIG. 6 the temperature probe is shown to be in contact with the inner surface of the container 32 at the second heat detecting area 84. Assuming a cylindrical shape to the solvent container, and the container having a substantially flat bottom and an open top, the location of the preferred first and second heat detecting areas (90 and 84) within the containers (32 and 62) is as follows: The first and second heat detecting areas are located at least two thirds of the distance away from the flat base portion of the solvent container so as not to provide an obstruction to the proper functioning of the cylinder 36 when the temperature probe is in contact with the heat detecting area. The first heat detecting area 90 is located on the inner surface of the container at any convenient point along the last ⅓ length of the container, any such point being the point nearest to the source of infra-red radiation in the latitudinal plane of the point. Heat will be turned on and off on demamd of the temperature probe during evaporation and the temperature probe will become free of solvent while there is still a solvent residue within the container, and will shut the infra-red heater off at this point. However, this placement of the probe in this heat detecting area 90 will result in some degree of temperature overshoot over the temperature display/set point panel 86 original set point, which may be deleterious to certain heat sensitive materials. For greater protection against product over heating at the conclusion of a procedure, the temperature probe should contact the second heat detecting area 84 on the inner surface of the container. This second heat detecting area 84 is in the same latitudinal plane within the container as is the first heat detecting area 90, but it is offset laterally approximately 30 degrees (either to the left or to the right) from the first heat detecting area 90, assuming that the first heat detecting area is at 0 degrees in this latitudinal plane. As can be best seen in FIGS. 6 and 7, the temperature probe 54 will become free of solvent more quickly than if it were in contact with the first heat detecting area 90, and therefore the infra-red heating is turned off at the temperature display/set point, the evaporation being safely and automatically monitored by this procedure without the necessity for operator attendance. If complete drying of the sample within the solvent container is desired, the heat setting on the temperature display/ set point is re-set a few degrees higher than the original boiling point temperature setting, and the remainder of the solvent is rapidly evaporated.

As an example of the above described procedures, 150 ml. of water was place in a 1 liter capacity solvent container under the conditions as described and illustrated for FIG. 1. The cylinder 36 was rotated to develop a thin film of water, the solvent container 32 was connected to a water cooled condenser which in turn was connected to a vacuum pump. The temperature probe was in place within the container as shown in FIG. 6. The boiling point of the water,i.e. the point at which the 600 watt infra-red heater was being turned on and off as indicated by the infra-red heater on/off indicator light 88 (i.e. the "flicker" point) in this case was 23 degrees C. After one hour and six minutes 124 ml. of water had been removed from the container, leaving a water residue of 26 ml. At this point no further infra-red heat was being supplied to the solvent container and the temperature probe indicated no excessive heat had been applied to the contents of the container.

In a similar experiment to one above 150 ml. of water was processed at an on/off heater light indicator 88 temperature or "flicker" point of 20 degrees C. After the infra-red heater ceased to go on and off the temperature display/set point was re-set to 25 degrees C. Within 10 minutes the container was completely dry. The temperature probe indicated a temperature of 61 degrees C., but feeling the external area of the container immediately adjacent the temperature probe revealed that only this immediate area of the container was warm. That portion of the container that had retained the residual solvent remained cool to the touch. It is to be expected that setting this final drying temperature slightly lower, as, for example, in this case at 23 degrees C. would result in a longer final drying period, but with less excess heat at the second heat detection area 84.

The following experiments demonstrate the clear superiority of infra-red heating over various forms of conductive heating for this application. For example, 1 lb. of water was placed in a 1 liter capacity container 32 as illustrated in FIG. 1, together with the cylinder 36 and magnet assembly 38, and the water was heated with an 800 watt infra-red hot plate similar to the infra-red heater 18 described for FIG. 1. The temperature of the water rose from 19 degrees C. To 90 degrees C. within the cylinder in 15.5 minutes. In contrast, placing 1 lb. of water in a PYREX beaker, and then heating the beaker on a conventional 800 watt conductive heating type hot plate caused the temperature to rise from 19 degrees C. to 90 degrees C. in 24.5 minutes.

In another experiment 1 lb. of water was placed in a 1 liter capacity solvent container 32 together with the TEFLON cylinder 36 and magnet assembly 38. The container was then placed in a water bath pre-heated to 85 degrees C. by a conventional 800 watt conductive heating type hot plate. The temperature in the water bath dropped to 80 degrees C. then rose to 95 degrees C. in 15 minutes. The water within the stationary TEFLON cylinder rose to 78 degrees C. in 45 minutes.

The above experiments indicate the clear advantages of infra-red heating over conventional conductive type heaters, and over water baths for providing efficient evaporation in rotary evaporator procedures. In addition the instant invention discloses an apparatus and method for controlling product temperature without operator assistance, and doing so in a simple and economical manner. While the invention describes a cylindrical PYREX glass solvent container, other constructions and shapes can be similarly employed, the limitation being that the container efficiently transmits infrared radiation within the practical limitations of infra-red emitting heating devices. The magnetic drive described could also make use of an external electromagnetic drive, and, of course, magnets other than the ceramic magnets noted can also be utilized.

While versions of the present invention have been shown and described in detail, various modifications and improvements thereon will become readily apparent to those skilled in the art. Accordingly, the spirit and scope of the present invention is to be limited only by the following claims.

What is claimed is:

1. An apparatus for evaporating solvents, comprising:
    (a) an infra-red radiation emitting heater;
    (b) a container for said solvents;
    (c) said container having an opening for the placement of a hollow cylinder within said container;
    (d) a closure for said opening in said container;
    (e) said container being able to transmit at least a portion of some wavelengths of said infra-red radiation;
    (f) means for connecting said container to a source of vacuum;
    (g) means for rotating a magnet, said magnet being located external to said container;
    (h) said cylinder having a base and a top, said cylinder being removably placed within said container;
    (i) said cylinder having means for magnetically attracting said base of said cylinder to said magnet;
    (j) said cylinder being able to transmit at least a portion of some wavelengths of said infra-red radiation;
    (k) said container and said cylinder being positioned in a substantially horizontal position relative to the placement of said heater, with the base of said cylinder being immediately adjacent said magnet, such that the magnetic field of said magnet securely engages said means for magnetically attracting said base of said cylinder to said magnet so that when said magnet is caused to rotate, said cylinder within said container is caused to rotate in synchrony with said magnet, causing a film of said solvent to be deposited on both the inner and outer surfaces of said cylinder, and when said source of vacuum is activated to create a vacuum within said container, and said heater is activated and is caused to emit said infra-red radiation, said solvent located in a space between an inner surface of said container and an outer surface of said cylinder is caused to be heated by said infra-red radiation, and during this same time period said solvent within said cylinder, and said solvent film on said outer surface of said cylinder is caused to be heated by said radiation, so that under the action of said vacuum and said infra-red radiation said solvent is caused to evaporate from said container;

(l) said heater emitting infra-red radiation predominantly in the electromagnetic wavelength range between 1 micron and 20 microns; and (m) said apparatus further comprising a temperature probe, said temperature probe being placed within said container, said temperature probe being electrically connected with said heater, said temperature probe being connected to means for displaying temperatures sensed by said probe, said temperature displaying means having means for turning said heater off when said temperature displaying means displays a pre-selected temperature set-point, and said temperature displaying means having means for turning said heater on when said temperature sensed by said probe falls below and is therefore cooler than said pre-selected temperature set-point, said heater therefore being turned on and off on demand of said temperature probe.

2. An apparatus according to claim 1 wherein said temperature probe is in contact with a first heat detecting area on the inner surface of said container, said first heat detecting area being located along a longitudinal portion of said container, said longitudinal portion of said container being in closest proximity with said heater, said first heat detecting area being located at a first point along said longitudinal portion, said first point being a spaced distance away from said magnet, said spaced distance being at least ⅔ of the length of said longitudinal portion.

3. An apparatus according to claim 2 wherein a second heat detecting area is located at a second point on the inner surface of said container, said second point being located in a latitudinal plane at least ⅔ along the length of said container away from said magnet, said second point being located a spaced latitudinal distance away from said longitudinal portion in said closest proximity with said heater.

4. An apparatus according to claim 3 wherein said spaced latitudinal distance away from said longitudinal portion is approximately 30 degrees either to the left or the right of said longitudinal portion, in a latitudinal plane in which said longitudinal portion is considered to be at 0 degrees.

5. An apparatus according to claim 2 wherein that portion of said container that is opposite said base of said cylinder is tilted away from said infra-red heater so that a larger portion of said solvent is contained within that half portion of said container as measured longitudinally from said base of said cylinder, as compared with the remaining half of said container.

6. An apparatus according to claim 5 wherein said portion of said container that is opposite said base of said cylinder is tilted approximately 15 degrees away from said infra-red heater.

7. An apparatus according to claim 3 wherein that portion of said container that is opposite said base of said cylinder is tilted away from said infra-red heater so that a larger portion of said solvent is contained within that half portion of said container as measured longitudinally from said base of said cylinder, as compared with the remaining half of said container.

8. An apparatus according to claim 7 wherein said portion of said container that is opposite said base of said cylinder is tilted approximately 15 degrees away from said infra-red heater.

9. An apparatus according to claim 2 further comprising a well area within said container, said well area being immediately adjacent said base of said cylinder, said well area extending below a main longitudinal portion of said container, so that a larger portion of said solvent is contained within that half portion of said container as measured longitudinally from said base of said cylinder, as compared with the remaining half portion of said container.

10. An apparatus according to claim 3 further comprising a well area within said container, said well area being immediately adjacent said base of said cylinder, said well area extending below a main longitudinal portion of said container, so that a larger portion of said solvent is contained within that half portion of said container as measured longitudinally from said base of said cylinder, as compared with the remaining half portion of said container.

11. An apparatus according to claim 10 wherein said spaced latitudinal distance away from said longitudinal portion is approximately 30 degrees either to the left or the right of said longitudinal portion, in a latitudinal plane of said container in which said longitudinal portion is considered to be at 0 degrees.

12. An apparatus for evaporating solvents, comprising:
(a) an infra-red radiation emitting heater;
(b) a container for said solvents;
(c) said container having an opening for the placement of a hollow cylinder within said container;
(d) a closure for said opening in said container;
(e) said container being able to transmit at least a portion of some wavelengths of said infra-red radiation;
(f) means for connecting said container to a source of vacuum;
(g) means for rotating a first magnet, said first magnet being located external to said container, said first magnet being circular in shape, said first magnet being fabricated in a ceramic material, said first magnet having at least 4 poles;
(h) said cylinder having a base and a top, said cylinder being removably placed within said container;
(i) said cylinder having a second magnet for attracting said base of said cylinder to said first magnet, said second magnet being circular in shape, said second magnet being fabricated in a ceramic material, said second magnet having at least 4 poles;
(j) said cylinder being able to transmit at least a portion of some wavelengths of said infra-red radiation; and
(k) said container and said cylinder being positioned in a substantially horizontal position relative to the placement of said heater, with the base of said cylinder being immediately adjacent said first magnet, such that the magnetic field of said first magnet securely engages the magnetic field of said second magnet so that when said first magnet is caused to rotate, said cylinder within said container is caused to rotate in synchrony with said first magnet, causing a film of said solvent to be deposited on both the inner and outer surfaces of said cylinder, and when said source of vacuum is activated to create a vacuum within said container, and said heater is activated and is caused to emit said infra-red radiation, said solvent located in a space between an inner surface of said container and an outer surface of said cylinder is caused to be heated by said infra-red radiation, and during this same time period said solvent within said cylinder, and said solvent film on said outer surface of said cylinder is caused to be heated by said radiation, so that under the action of said vacuum and said infra-red radiation said solvent is caused to evaporate from said container.

\* \* \* \* \*